Dec. 31, 1935.  C. T. DENKER  2,026,220
BRAKE CONTROL DEVICE
Filed April 20, 1933
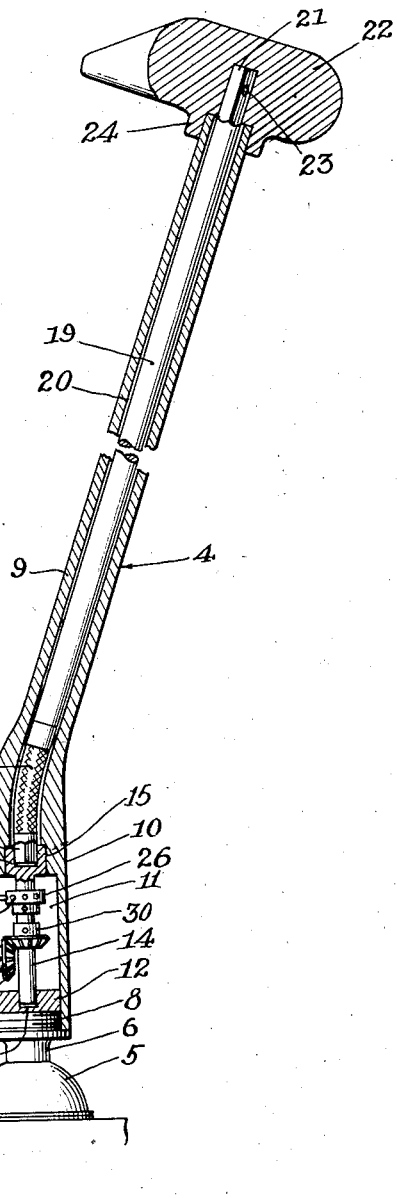
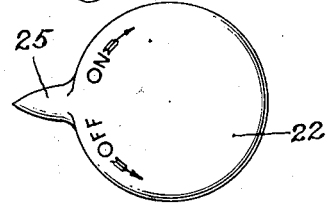
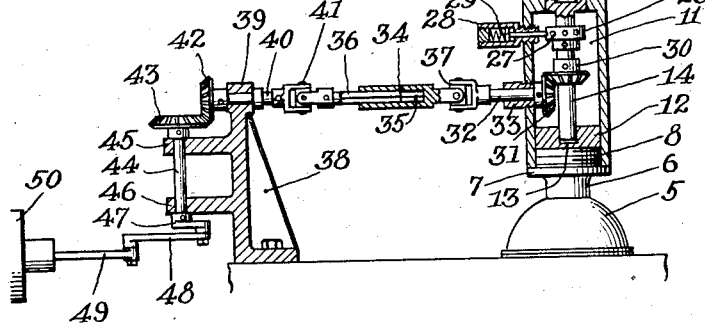
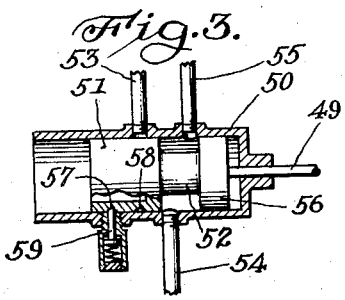
INVENTOR
Charles T. Denker
BY Wm. D. Bell
ATTORNEY Patented Dec. 31, 1935

2,026,220

UNITED STATES PATENT OFFICE 2,026,220

BRAKE CONTROL DEVICE

Charles T. Denker, Chicago, Ill., assignor to Loraine L. Denker, Chicago, Ill.

Application April 20, 1933, Serial No. 666,980

11 Claims. (Cl. 192—4)

This invention relates to brake control devices particularly adapted for use in automotive vehicles and the like.

The development of pneumatic and hydraulic brakes for automotive vehicles and particularly the development of the vacuum brake has tended to reduce the effort entailed in the operation of brakes of automotive vehicles. It is no longer necessary to exert heavy pressure through a foot lever to effect operation of the brakes because the above described brakes embody power amplification and consequently the brakes may be effectively operated with very little pressure by the operator. Further, the tendency at the present time is to simplify the operation of automotive vehicles. Hence, one of the objects of my invention is to simplify the operation of automotive vehicles by providing a brake control which will be simple and substantially effortless in operation.

Another object is to provide a brake control device which may be associated with the usual shift lever provided in connection with the change gear transmission to thereby locate the brake control device in a position within easy reach of the operator and such location of the control reduces the number of control positions in the vehicle.

A selected embodiment of my invention is illustrated in the accompanying drawing wherein Fig. 1 is a vertical sectional view;

Fig. 2 is a top plan view of the control handle; and

Fig. 3 is a sectional detail view of one form of brake operating means with which my invention may be used.

Automotive vehicles are customarily equipped with a brake on each wheel thereof and suitable means are provided for operating these brakes to reduce the inertia and momentum and to stop the vehicle. Pneumatic and hydraulic means have been provided for operating the brakes as well as a vacuum operated means. The vacuum for this latter type of means is supplied from the manifold of the engine of the vehicle and I will describe my invention hereinafter in connection with such brake operating means but it is to be understood that it is equally adaptable for use with pneumatic or hydraulic brake operating means.

The change gear transmission of an automotive vehicle is equipped with a shift lever positioned within easy reach of the operator. Such a shift lever is generally indicated by 4 in the accompanying drawing, and it is mounted in a ball socket 5 and is connected in the usual way to the change gears in the transmission. A stem 6 projects from the ball socket and is provided with a collar 7 above which there is a threaded boss 8. The shift lever 4 includes a reduced tubular section 9 which extends at an angle to but unitary with a vertically extending enlarged portion 10. The lower end of the enlarged portion 10 is bored out to provide a pocket 11 and the outer end of the pocket is threaded onto the boss 8 to connect the shift lever in position. A bearing block 12 extends across the pocket 11 above the boss 8 and has a socket 13 therein in which one end of a shaft 14 is journaled. The opposite end of the shaft 14 is enlarged and is journaled in a recess 15 provided at the bottom of the pocket 11. In the enlarged end of the enlarged portion of the shaft 14 I provide a socket 16 in which the polygonal end 17 on a flexible shaft 18 is seated. A rod 19 is journaled in a bore 20 provided in the portion 9 and extending to the bottom of the recess 15. Since the portion 9 extends at an angle to the portion 10, a part of the bore 20 is curved and the flexible shaft 18 is extended through this curved portion and is connected to the adjacent end of the rod 19.

At the upper end of the rod 19 is a polygonal end portion 21 that extends into a handle 22 and this end portion is fast in the handle by a pin 23 or the like. The handle includes a depending bearing part 24 which rotatably embraces the upper end of the portion 9. A tongue 25 extends radially from the handle 24 and is adapted to be disposed between the fingers of the operator of the vehicle when he grasps the handle 22. Suitable indicia may be provided on the top of the handle 22 as shown in Fig. 2 wherein the words "On" and "Off" appear in association with which are direction indicating means such as arrows.

A collar 26 is fast on the shaft 14 near the top of the pocket 11 and a plurality of spaced recesses 27 are provided in the periphery of this collar. A housing 28 is screw-threaded into the side of the pocket 11 and projects into said pocket 11. A spring-pressed plunger 29 is mounted in the housing 28 and successively seats in the recesses 27 upon rotation of the shaft to hold the shaft 14 and therefore the flexible shaft 18 and the rod 19 in the positions into which they are moved upon rotation thereof. A beveled gear 30 is fast on the shaft 14 adjacent the collar 26 and meshes with a beveled gear 31 fast on the shaft 32 journaled in the boss 33 on the wall of the pocket 11. A sleeve 34 has a polygonal socket 35 therein into which the polygonal shaft 36 is extended for sliding movement, the polygonal shape of the pocket and shaft preventing relative rotational movement of these parts. The sleeve 34 is connected to the shaft 32 by a universal joint 37.

A bracket 38 is spaced from the ball socket 5 and has a bearing 39 at the upper end thereof in which a shaft 40 is journaled. The shaft 40 is connected to the adjacent end of the shaft 36 by a universal joint 41. A beveled gear 42 is fast on the shaft 40 and meshes with a beveled gear 43 fast on the shaft 44 journaled in arms 45 and 46 projecting from the bracket 48. A crank 47 is fast at the lower end of the shaft 44 and one end of a link 48 is pivotally connected to the free end of the crank. The other end of the link 48 is pivotally connected to a rod 49. The rod 49 is a part of the regulating device for the brake operating means and as illustrated includes a cylinder 50 having a piston 51 therein. The piston 51 includes a reduced portion 52. A pipe 53 leads from the cylinder 50 to the manifold of the vehicle and a vacuum is drawn therein. A pipe 54 leads to the operating devices associated with the brakes at the wheels of the vehicle. When the piston 51 is arranged in the position shown in Fig. 3, the pipe 53 is shut off and the brakes are released for a pipe 55 communicates with the cylinder 50 and leads to atmosphere and when the piston is positioned as shown in Fig. 3, communication is established between pipes 55 and 54 through the reduced portion of the piston. Spaced recesses 57 and 58 are provided in the periphery of the piston 51 and a spring-pressed pin 59 cooperates therewith to hold the piston either in the position illustrated in Fig. 3 or in the position whereat communication is established between pipes 53 and 54 which causes application of the brakes.

The handle 22 is located within convenient reach of the operator who may grasp and turn this handle to thereby turn the rod 19, the flexible shaft 18, and shaft 14. This movement of the shaft 14 is transmitted through the beveled gears 30 and 31 to the shaft 32, through the universal joint 37, sleeve 34, shaft 36, universal joint 41 to shaft 40 whereupon beveled gears 42 and 43 are rotated to move the shaft 44 and hence the crank 47, link 48 and rod 49 to thereby move the piston 51 in the cylinder 50. Dependent upon the direction in which the handle 22 is rotated, the brakes are applied or released.

The spring-pressed pins 59 and 29 serve to hold the parts in the positions into which they are moved. It is to be understood that one or the other of the spring-pressed pins, and the cooperating recesses, may be sufficient and consequently both need not be provided for a spring-pressed pin located in approximately either of the positions shown will accomplish the end desired. The universal joints and the slidable connection between the shaft 36 and the sleeve 34 permit the shift lever 4 to be moved as required. I have shown the parts operated from the shaft 14 as being positioned above the floor board of the vehicle and this is an adaptation of the invention to automotive vehicles already in use but it is to be understood that in new vehicles these parts will preferably be located below the floor board. However, the particular location thereof is not important.

It is manifest from the foregoing description that I have provided a brake control device located within convenient reach of the operator and that the device is susceptible of easy operation. By associating the handle with the usual gear shift lever, the number of control positions is reduced which tends to simplify operation of the vehicle.

While I have illustrated and described a preferred form of construction for my invention, it is to be understood that this is capable of variation and modification and I therefore do not wish to be limited to the precise details set forth but desire to avail myself of such changes and alterations as fall within the purview of the following claims.

I claim:

1. In an automotive vehicle which has a movable lever for operating the change gear transmission therein and means for controlling the brakes thereof, the combination therewith of said lever including a substantially vertically extending part and a part extending at an angle thereto, said lever having a bore therein enlarged in the vertically extending part, a shaft journaled in said bore and including a flexible section interconnecting the parts of said shaft in the inclined and vertically extending parts, movement transmitting means in the enlarged part of said bore and connected to said shaft, operating means for the brake controlling means, and flexible means interconnecting said movement transmitting means and the operating means.

2. In an automotive vehicle which has a movable lever for operating the change gear transmission therein and means for controlling the brakes thereof, the combination therewith of said lever including a substantially vertically extending part and a part extending at an angle thereto, said lever having a bore therein enlarged in the vertically extending part, a shaft journaled in said bore and including a flexible section interconnecting the parts of said shaft in the inclined and vertically extending parts, movement transmitting means in the enlarged part of said bore and connected to said shaft, operating means for the brake controlling means, and an extensible shaft having flexible connections therein and interconnecting the movement transmitting means in said bore and said operating means.

3. In an automotive vehicle which has a movable lever for operating the change gear transmission therein and means for controlling the brakes thereof, the combination therewith of said lever including a substantially vertically extending part and a part extending at an angle thereto, said lever having a bore therein enlarged in the vertically extending part, a shaft journaled in said bore and including a flexible section interconnecting the parts of said shaft in the inclined and vertically extending parts, movement transmitting means in the enlarged part of said bore and connected to said shaft, operating means for the brake controlling means, and means including a sectional shaft embodying slidably interconnected parts and having flexible means associated therewith, said last-named means interconnecting said movement transmitting means and the brake controlling means.

4. In an automotive vehicle which has a movable lever for operating the change gear transmission therein and means for controlling the brakes thereof, the combination therewith of means for operating the brake controlling means and including a handle on said lever movable relative to the lever, means for imparting movement of said handle to the operable parts of the brake controlling means and including a part passing through said lever, and means in said lever and cooperating with said part for holding the operable parts of said brake controlling means in predetermined positions.

5. In an automotive vehicle which has a movable lever for operating the change gear transmission therein and means for controlling the brakes thereof, the combination therewith of said lever including a substantially vertically extending part and a part extending at an angle thereto, said lever having a bore therein enlarged in the vertically extending part, a shaft journaled in said bore and including a flexible section interconnecting the parts of said shaft in the inclined and vertically extending parts, movement transmitting means in the enlarged part of said bore and connected to said shaft, operating means for the brake controlling means, flexible means interconnecting said movement transmitting means and the operating means, and means for holding the parts operated by said handle in the positions into which they are moved by operation of said handle.

6. In an automotive vehicle which has a change gear transmission therein including an operating part extending therefrom, and means for controlling the brakes of the vehicle, the combination therewith of a lever having a bend therein, means connecting said lever to the operating part of the change gear transmission, movement transmitting means associated with said lever and including a flexible part at the bend in said lever, a handle on said lever, means connecting said handle to the movement transmitting means, and means connecting the movement transmitting means to the means for controlling the operation of the brakes of the vehicle.

7. In an automotive vehicle which has a change gear transmission therein including an operating part extending therefrom, and means for controlling the brakes of the vehicle, the combination therewith of a lever having a bend therein, means connecting said lever to the operating part of the change gear transmission, said lever having a bore therein, a shaft extended through said bore and including a flexible part at the bend in said lever, a handle on said lever and connected to said shaft, and means connecting the shaft to the means for controlling the operation of the brakes of the vehicle.

8. In an automotive vehicle which has a change gear transmission therein including an operating part extending therefrom, and means for controlling the brakes of the vehicle, the combination therewith of a lever comprising an enlarged portion, means connecting the enlarged portion of said lever to the operating part of the change gear transmission, movement transmitting means mounted in the enlarged portion of said lever, a handle on said lever, means connecting said handle to the movement transmitting means in said lever, means connecting the movement transmitting means in said lever to the means for controlling the operation of the brakes of the vehicle, and means cooperating with said movement transmitting means for retaining said movement transmitting means in adjusted positions.

9. In an automotive vehicle which has a change gear transmission therein including an operating part extending therefrom, and means for controlling the brakes of the vehicle, the combination therewith of a lever comprising an enlarged portion, means connecting the enlarged portion of said lever to the operating part of the change gear transmission, movement transmitting means mounted in the enlarged portion of said lever, a handle on said lever, said lever having a bore therein, a shaft extended through said bore from said handle to said movement transmitting means, means connecting the movement transmitting means in said lever to the means for controlling the operation of the brakes of the vehicle, and means cooperating with said movement transmitting means for retaining said movement transmitting means in adjusted positions.

10. A device for operating the pressure controlled brakes of an automotive vehicle or the like, a lever, a handle on said lever, valve means including a reciprocal part for controlling the application of pressure on said brakes, means for connecting said handle to said reciprocal part whereby operation of said handle adjusts the position of said reciprocal part, and means for holding said reciprocal part in the adjusted positions into which it is moved upon the operation of said handle.

11. In an automotive vehicle which has a change gear transmission therein and pressure operated brakes, the combination therewith of means for controlling the pressure applied on said brakes, said means including a reciprocal part, a lever for operating said change gear transmission, a handle on said lever, means connecting said handle to said reciprocal part whereby said handle may be operated to move said reciprocal part into adjusted positions, and means for retaining said reciprocal part in the adjusted positions into which it is moved upon the operation of said handle.

CHARLES T. DENKER.